(No Model.) 2 Sheets—Sheet 1.
A. T. DOWDEN.
POTATO HARVESTER.
No. 434,980. Patented Aug. 26, 1890.
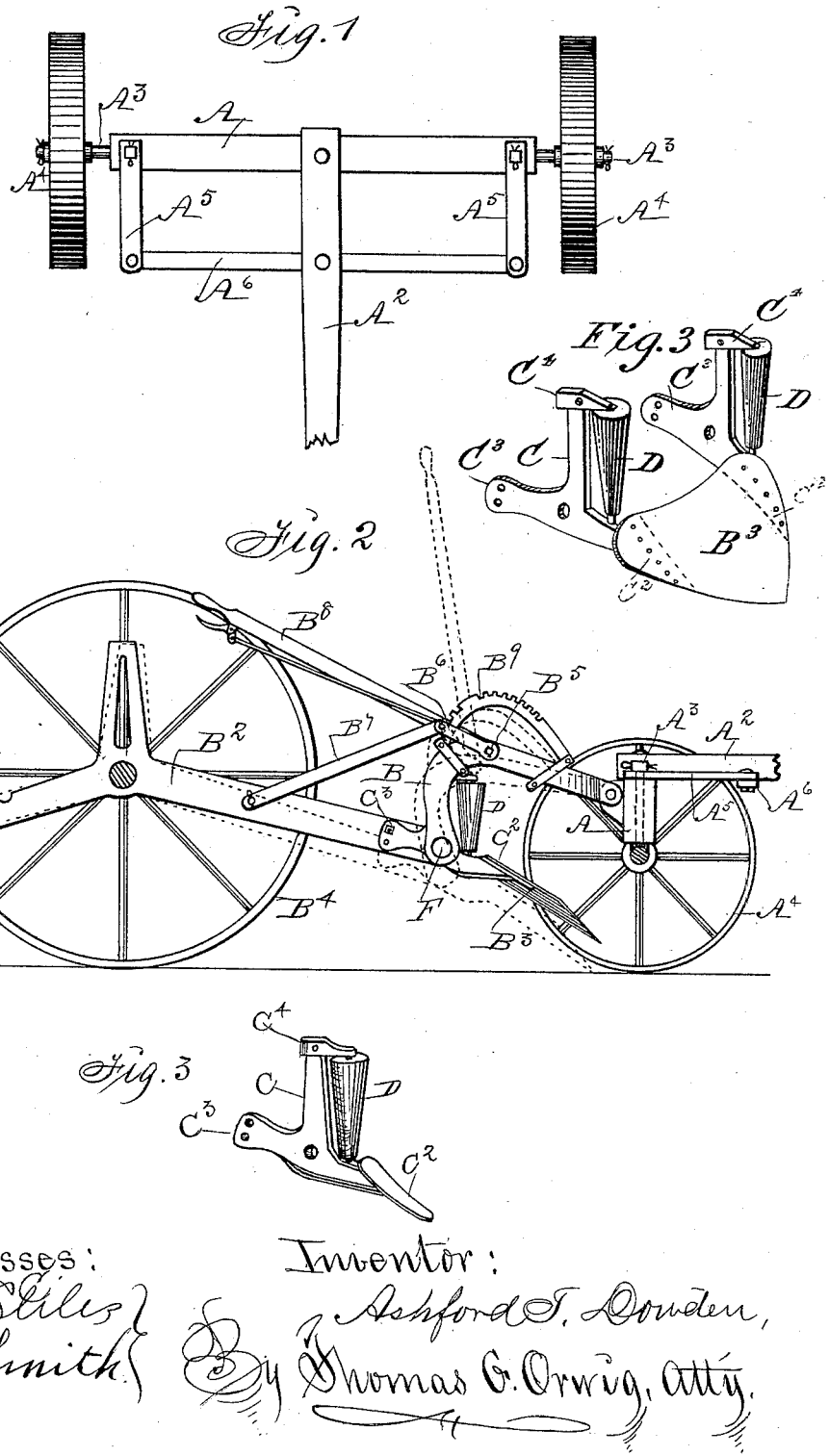
Witnesses:
C. U. Stiles
M. P. Smith
Inventor:
Ashford T. Dowden,
By Thomas C. Orwig, Atty.

(No Model.) 2 Sheets—Sheet 2.

A. T. DOWDEN.
POTATO HARVESTER.

No. 434,980. Patented Aug. 26, 1890.

UNITED STATES PATENT OFFICE.

ASHFORD T. DOWDEN, OF PRAIRIE CITY, IOWA.

POTATO-HARVESTER.

SPECIFICATION forming part of Letters Patent No. 434,980, dated August 26, 1890.

Application filed May 18, 1889. Serial No. 311,345. (No model.)

*To all whom it may concern:*

Be it known that I, ASHFORD T. DOWDEN, a citizen of the United States of America, and a resident of Prairie City, in the county of Jasper and State of Iowa, have invented new and useful Improvements in Potato-Harvesters, of which the following is a specification.

My improvements relate to the machine for which United States Letters Patent No. 316,015, dated April 21, 1885, and No. 357,119, dated February 1, 1887, were issued to me; and my invention consists in the construction and combination of frames adapted to carry a plow and idlers or rotary fenders at the sides of the plow, as hereinafter set forth, to facilitate change in the direction of advance, the regulation of the depth of the plow, and to improve the strength, convenience, and efficiency of the complete machine.

Figure 4:
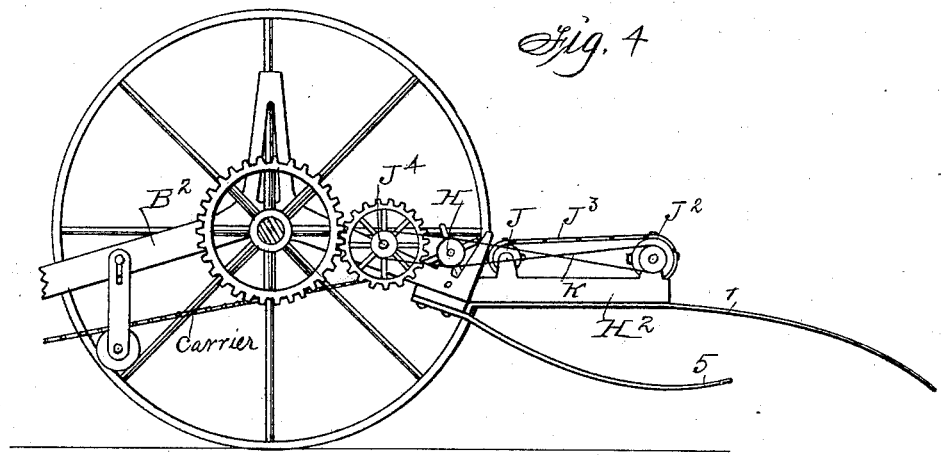
Figure 5:
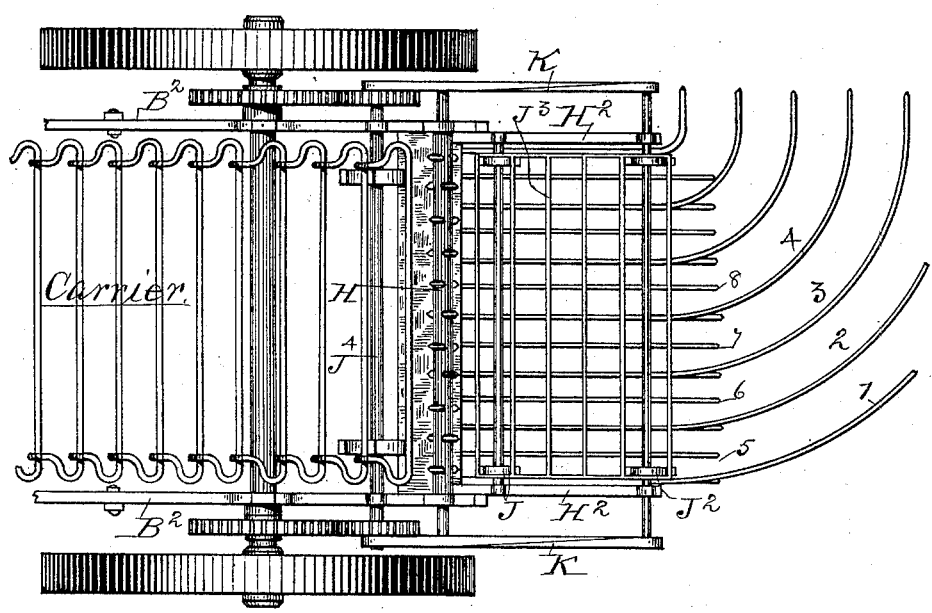

Figure 1 of the accompanying drawings is a top view of the flexible carriage adapted to carry and direct the plow. Fig. 2 is a longitudinal side elevation, partly in section, showing the mechanism for raising and lowering the plow. Fig. 3 is a perspective view showing two side frames and a scoop-shaped plow and two idlers combined. Fig. 4 is a side view of the rear portion of the machine, partly in section; and Fig. 5, a plan or top view showing the reel and vine-carrier and the two series of tines connected with the rear end of the endless carrier.

A is an axle-tree, and $A^2$ a pole pivoted to its center.

$A^3$ are elbow-shaped axles pivoted to the ends of the axle A.

$A^4$ are traction-wheels on the axles, and $A^5$ are arms rigidly fixed to the top ends of vertical portions of the axles.

$A^6$ is an equalizing-bar pivoted to the pole at its center and to the ends of the arms $A^5$ in such a manner that when the pole is turned to one side by the horses the axles will vibrate and change the inclination of the wheels, so that the direction of advance can be instantly changed as required to facilitate turning about the machine at the end of a row of potatoes.

B are mating curved metal side bars of the plow-carrying frame pivoted to the axle-tree, and $B^2$ the metal side bars of the carrier-frame that extends from the plow $B^3$ to the axle of the rear carriage that is supported upon wheels $B^4$.

$B^5$ is a rock-shaft in bearings formed in or fixed to the bars B. This shaft is connected with the bars $B^2$ of the carrier-frame by means of cranks $B^6$ and arms $B^7$, attached to the carrier-frame in such a manner that when the rock-shaft is actuated by means of a lever $B^8$, fixed thereto, the plow and front portion of the carrier and its frame can be raised and lowered.

$B^9$ is a rack fixed to one end of the bars B in such a manner that it will be engaged by a latch or bolt carried by the lever $B^8$ to lock the rock-shaft in a fixed position as required to retain the plow elevated and inoperative or at any point of elevation desired while in operation.

C is an elbow-shaped frame cast complete in one piece. It has a curved extension $C^2$ at its front end, adapted to receive and support the convex under side of the scoop-shaped plow $B^3$.

$C^3$ is a rear extension in the form of a clevis, that is adapted to be adjustably connected with the front ends of the side bars $B^2$ of the carrier-frame as required to change the inclination of the plow and to govern its depth in the ground. At the top of the vertical part of the frame is a lateral extension $C^4$, formed on or fixed thereto, that serves as a bearing for an idler D, that has a coinciding bearing in the horizontal portion of the frame. One of those frames and idlers is secured to each side of the plow $B^3$ and the plow-carrier frame by means of bolts in such a manner that the plow and idlers and frame will be raised and lowered jointly.

F is a rotating axle in bearings formed in the frame C. It is provided with pulleys, over which the endless carrier G is placed and operated.

H is a reel in bearings fixed to the rear portion of the side bars $B^2$ of the carrier-frame.

$H^2$ is an auxiliary frame attached to the rear end of the carrier-frame, preferably in such a manner that its free end can be raised and lowered and retained at any elevation desired.

J and $J^2$ are the rotating shafts of a vine-carrier $J^3$ in bearings fixed to the frame $H^2$.

$J^4$ is the rotating shaft of the carrier G, connected with the driving-wheel by means of gearing.

K is a belt connected with the shafts $J^2$ and $J^4$ and the shaft of the reel H in such a manner that motion will be transmitted to the reel and the vine-carrier as required to pass vines over the reel rearward, and from thence under the vine-carrier and over a series of tines 1 2 3 4, that are fixed to the auxiliary frame as required to direct the vines to one side and to drop them in a row that will extend parallel with the line of advance of the machine.

5 6 7 8 represent a series of curved tines fixed to the auxiliary frame in such a manner that the potatoes carried up from the plow will drop upon them, to be thereby directed rearward and deposited in a row on top of the ground and at the side of the row of vines and weeds.

$D^2$ is an idler adjustably connected with the sides $B^2$ of the carrier-frame to support the endless carrier G.

I claim as my invention—

1. The frame $B^2$, supported at its rear end upon traction-wheels, the frame composed of the curved bars B, the side frames C, the fixed plow $B^3$, an endless carrier, and the carriage composed of the axle A, pole $A^2$, elbow-shaped axles $A^3$, wheels $A^4$, arms $A^5$, and an evener $A^6$, arranged and combined in a potato-harvester, substantially as shown and described, for the purposes stated.

2. The plow-carrying frame composed of the curved bars B, the frame composed of the side bars $B^2$ and the rock-shaft $B^5$, having cranks on its ends, and the arms $B^7$, fixed to the bars $B^2$, and the frame C, having extensions $C^2$ and $C^3$, arranged and combined substantially as shown and described, for the purposes stated.

3. The frames C, having curved extensions $C^2$ at their front and extensions $C^3$ at the rear ends of their horizontal portions and lateral extensions and bearings for an idler at their tops, idlers D, a plow, an arched frame hinged to the front axle, and the side bars of a frame connected with the rear axle, arranged and combined substantially as shown and described, for the purposes stated.

ASHFORD T. DOWDEN.

Witnesses:
J. R. GILL,
GEO. A. GILL.